United States Patent

[11] 3,607,179

| [72] | Inventors | David Gordon Loukes<br>Prescot;<br>Alan Edward Hay, Ormskirk, both of England |
|------|-----------|---|
| [21] | Appl. No. | 809,119 |
| [22] | Filed | Mar. 21, 1969 |
| [45] | Patented | Sept. 21, 1971 |
| [73] | Assignee | Pilkington Brothers Limited<br>Liverpool, Lancashire, England |
| [32] | Priority | Oct. 22, 1965 |
| [33] | | Great Britain |
| [31] | | 44900 |
| | | Continuation-in-part of application Ser. No. 585,889, Oct. 11, 1966, now abandoned. |

[54] METHOD AND APPARATUS FOR PRODUCING FLOAT GLASS BY OXIDIZING GLASS-FORMING ELEMENTS
22 Claims, 7 Drawing Figs.

[52] U.S. Cl. .................................................. 65/32,
65/30; 65/99 A; 65/134; 65/157; 65/182 R; 65/374
[51] Int. Cl. ........................................................ C03b 18/00
[50] Field of Search.......................................... 65/99 A, 65
A, 182, 30, 32, 27, 157, 168, 374, 134

[56] References Cited
UNITED STATES PATENTS

| 3,330,635 | 7/1967 | Loukes | 65/99 A |
| 3,330,637 | 7/1967 | Loukes | 65/99 A |
| 3,351,447 | 11/1967 | Lawrenson | 65/99 A |
| 3,361,550 | 1/1968 | Murphy | 65/99 A |
| 3,450,516 | 6/1969 | Emhiser | 65/99 A |

OTHER REFERENCES

Physical Chemistry of Metals, L. S. Darken and R. W. Gorry, McGraw Hill, New York, 1953, p. 349

Primary Examiner—S. Leon Bashore
Assistant Examiner—J. B. Hardaway
Attorney—Morrison, Kennedy & Campbell ABSTRACT: Glass-forming elements are fed into a body of molten metal which is maintained under controlled oxidizing and thermal conditions to produce glass-forming oxides therein in relative proportions to synthesize a particular glass which collects as a layer on the surface of the molten metal and is removed as a layer from the metal surface.

Fig. 1.

Inventors
DAVID GORDON LOUKES
and ALAN EDWARD HAY

Inventors
DAVID GORDON LOUKES
and ALAN EDWARD HAY

Fig. 4.

Inventors
DAVID GORDON LOUKES
and ALAN EDWARD HAY
By
Morrison, Kennedy & Campbell
Attorneys

Fig.7.

Inventors
DAVID GORDON LOUKES
and ALAN EDWARD HAY

METHOD AND APPARATUS FOR PRODUCING FLOAT GLASS BY OXIDIZING GLASS-FORMING ELEMENTS

CROSS-REFERENCES TO RELATED APPLICATIONS

This application is a continuation-in-part of our copending application Ser. No. 585,889 filed Oct. 11, 1966, and now abandoned.

BACKGROUND OF THE INVENTION

This invention relates to the manufacture of glass and more especially to methods of manufacturing glass employing a bath of molten metal, and apparatus for carrying out those methods.

It is a main object of the present invention to provide a new method of manufacturing glass in which glass-forming compounds combine to form glass at a much lower temperature than has been possible hitherto.

A further object of the invention is to provide an improved method of manufacturing glass in the form of a thin film.

SUMMARY

According to the invention a glass-manufacturing method comprises feeding glass-forming elements into a body of molten metal in proportions to synthesize a glass, maintaining the molten metal under controlled chemical and thermal conditions to produce therein from said elements concentrations of glass-forming compounds which combine to produce the glass, permitting the glass to form as a layer on the surface of the molten metal, and removing the glass layer from the molten metal surface.

The chemical conditions may be such that oxides and/or sulfides of the elements are formed and a preferred method according to the invention comprises feeding in suitable proportions to a body of molten metal elements which oxidize preferentially to the molten metal and whose oxides form glass, maintaining the molten metal under controlled oxidizing and thermal conditions to produce glass-forming oxides in prescribed relative concentrations for constituting a particular glass and to synthesize that glass from the oxide so formed, which glass forms a layer on the surface of the molten metal, and removing the glass from the molten metal surface.

By this method the glass-forming compounds, usually oxides, are in a very finely divided form or even in molecular form when they combine in the molten metal to synthesize the glass and so the glass-forming operation can be carried out at a much lower temperature than the usual temperature employed for melting glass-forming batch.

For example the method of synthesizing glass according to the invention can be carried out with the temperature of the molten metal controlled to be in the region of 1,000$_L$ C. Usually, in glass-melting furnaces, it is necessary to raise the glass-forming materials to a temperature of about 1,500$_L$ C.

Alternatively prereacted glass-forming compounds for example oxides and/or sulfides may be added to the molten metal in finely divided form and suitable chemical conditions are maintained so that the compounds remain in that state before their synthesis to form the glass.

In some instances some of the particles, for example particles of oxide may not be wholly dissolved but rather become incorporated in a glassy matrix to produce a translucent glass which can be used in electronic applications. The glass may for example include undissolved particles of alumina.

The temperature at which oxidation of the elements added to the body of molten metal takes place, may be a sufficient temperature for synthesis of the desired glass from the oxides so formed. In some methods according to the invention however the oxides are formed at one temperature and are condensed together to form the desired glass at another temperature.

In one way of carrying out the process the controlled oxidation conditions are such that there is only sufficient oxygen present to combine with the elements added to the molten metal. Since the added elements are all elements which oxidize preferentially to the molten metal, there is a negligible amount of the oxide of the molten metal present in the finished glass.

Some glasses however must contain the metal of the bath in the form of the oxide of that metal as one constituent of the glass. In order to form the oxide of the bath metal at the same time as the oxides of the added elements are formed, more oxygen must be supplied than is merely necessary to produce in the molten metal the necessary relative concentrations of the oxides of the added elements, so that the additional-required concentration of oxide of the bath metal is present.

The method of the invention is preferably carried out continuously on an elongated bath of molten metal and there is a circulation of the molten metal down the bath towards the colder end of the bath which assists in advancing the layer of glass to that colder end where it is discharged in ribbon form.

Preferably the molten metal is molten tin or a molten tin alloy having a specific gravity greater than that of the glass and in which tin predominates. The glass layer appears as a very thin film of glass on the surface of the molten metal for example a film of glass about 0.1 mm. thick. This thin film of glass can be removed from the surface of the bath without losing its width and its thinness.

If the rate at which the glass is removed from the bath is less than the rate at which the glass is synthesized, the glass may collect on the molten metal surface as a thicker layer and a layer of flat glass for example 3 mm. thick can be produced by a method according to the invention.

The tin alloy forming the bath may be an alloy of tin with copper, silver or nickel. Each of these metals is less chemically reactive than tin and is also less chemically reactive than the elements which are added to the alloy bath so that there is substantially no oxidation of the copper, silver or nickel.

One preferred composition of the bath is a tin alloy consisting of 80 percent tin and 20 percent copper.

Tin-free alloys may be used as the body of molten metal for example an alloy of 72 percent silver and 28 percent copper.

Usually one of the elements added to the bath is a fundamental glass-forming element, preferably silicon, boron or phosphorus. In addition the added elements may include one or more of the metals sodium, potassium, barium, calcium and magnesium.

When the elements are metals they can be added directly to the molten metal, desirably in the form of an alloy of the additive metal with at least one of the metals constituting the body of molten metal. For example the elements silicon, sodium and calcium can be added to the molten metal in the form of an alloy consisting of 1 percent of the element, 79 percent tin and 20 percent copper.

The preferred way of adding the elements to the molten metal is by electrolytic release from compounds of the elements which are in contact with the molten metal. This electrolytic release can be achieved from a plurality of electrolytic cells defined at one end of the tank structure each with an impeller for circulating the molten metal through the cell so that it carried the released element into a region of the bath where the elements mix together prior to subjection of the elements to oxidizing conditions.

DESCRIPTION OF THE PREFERRED EMBODIMENTS

Figure 1:
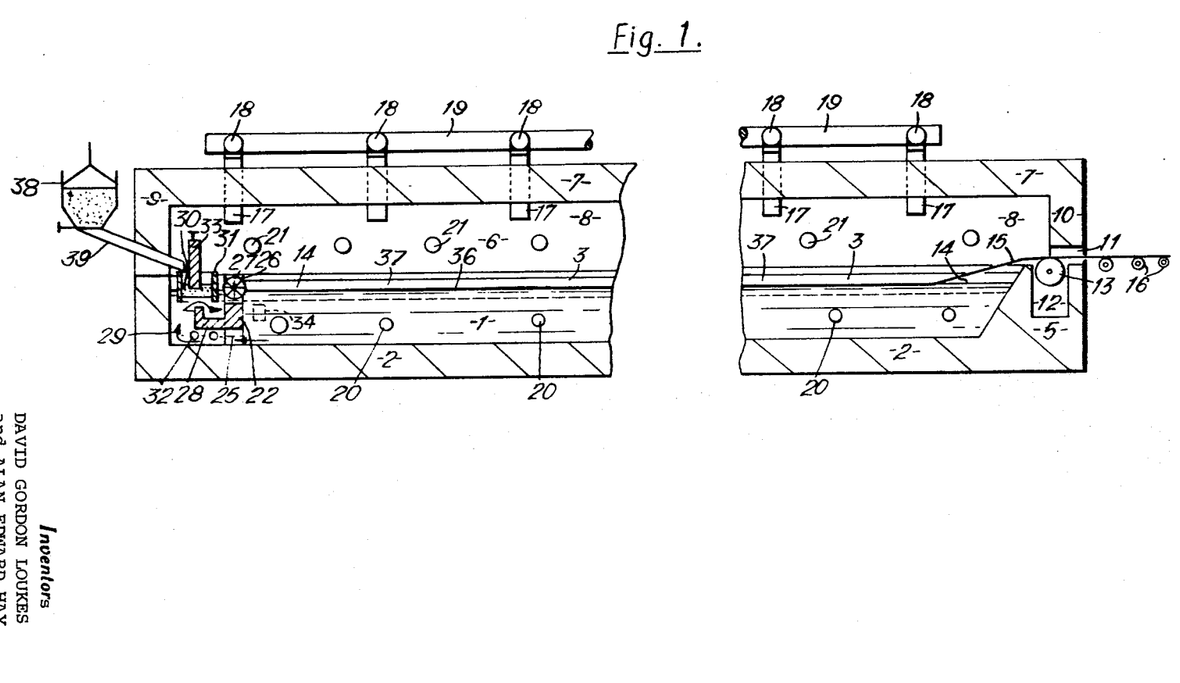
FIG. 1 is a sectional elevation of apparatus according to the invention showing an elongated tank structure containing a bath of molten metal and a roof structure over the bath.
Figures 2, 3:
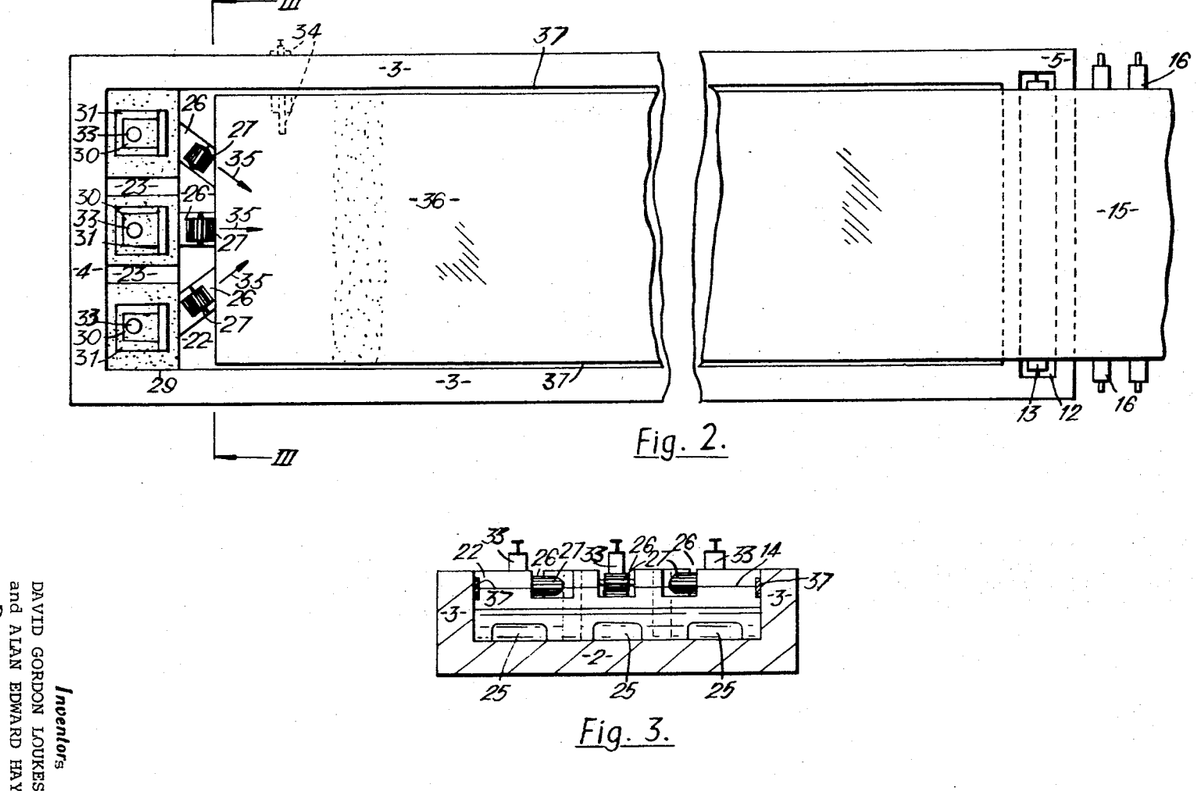
FIG. 2 is a plan view of the apparatus of FIG. 1 with the roof structure removed.
FIG. 3 is a section on the line III—III of FIG. 2.

Referring to the drawings, a bath 1 of molten metal, for example a molten alloy consisting of 80 percent tin and 20 percent copper is contained in an elongated tank structure having a floor 2, integral sidewalls 3 and integral end walls 4 and 5.

A roof structure bridges the tank structure and defines a tunnellike headspace 6 over the bath. The roof structure comprises a roof 7, sidewalls 8, and end walls 9 and 10. The end walls 9 rests on the end wall 4 of the tank structure, but at the other end of the tank structure there is defined an outlet 11 for glass in ribbon form produced on the bath. The outlet 11 is defined between the lower face of the end wall 10 of the roof structure and the upper face of the end wall 5 of the tank structure.

A transverse pit 12 is formed in the outlet end wall 5 of the tank structure, and a roller 13 is mounted in the pit so that its upper surface stands above the surface level 14 of the molten metal bath and the ribbon of glass 15 produced on the bath is lifted off the bath surface 14 by the roller 13 for discharge through the outlet 11 on to conveyor rollers 16 which are mounted outside the outlet end of the tank structure and convey the glass to an annealing lehr in well-known manner.

A special atmosphere is maintained in the headspace 6 over the bath 1. The atmosphere is introduced into the headspace through ducts 17 extending through the roof 7 and connected by headers 18 to atmosphere supply ducts 19. The atmosphere is maintained at a plenum in the headspace so that there is a flow of atmosphere outwardly through the outlet 11 from the bath.

Temperature regulators 20 are immersed in the bath and there are temperature regulators 21 in the headspace over the bath so that the temperature of the molten metal can be accurately controlled right along the bath.

A number of electrolytic cells are built into the tank structure at the end of the bath opposite to the outlet end. A wall 22 is built across the tank structure and is specially shaped as will be described in order to enhance desired flows of molten metal. The space between the wall 22 and the end wall 4 of the tank structure is divided by partitions 23 into a number of cells. Three cells are provided in the embodiment described. Each cell communicates with the main part of the bath of molten metal downstream of the wall 22, through an inlet channel 25 cut in the bottom of the wall 22, and at the surface level 14 of the bath of molten metal there is an outlet channel 26 for each cell cut into the top of the wall 22. The channel 26 of the center cell is parallel to the sidewalls of the tank structure, whereas the channels 26 of both the outer cells point inwardly towards the centerline of the tank structure, as clearly shown in FIG. 3 in particular.

A paddle wheel impeller 27 is mounted in each of the channels 26. The axes of the paddle wheels lie above the surface level 18 of the molten metal but the vanes dip into the molten metal almost to the bottom of the channels 26. The paddle wheels are rotated by driving means, not shown, to cause converging outward flows of molten metal from the cells through the channels 26 and along the surface of the main part of the bath, while molten metal is drawn into the cells from the bottom of the bath through the inlet channels 25. An L-shaped baffle wall 28 is mounted in each cell to direct the flow of molten metal through the cell as indicated by the arrows 29.

A layer 30 of a molten salt is supported on the surface of the molten metal in each of the cells, and each of the layers 30 is contained in a carbon barrier 31 which has a refractory lining. The barriers 31 retain the layers of molten salt in the cells and prevent them from escaping through the outlet channels 26.

Heaters 32 are mounted near the bottom of each cell to heat the molten metal drawn in through the channel 25 before it rises and flows across the underface of the layer 30 of molten salt confined in the cell. Each cell has a carbon electrode 33 dipping into its salt layer 30, and there is another carbon electrode 34 immersed in the molten metal of the bath outside the cells. The electrode 34 is insulated from and sealed into a sidewall 3 of the tank structure.

Three different salts are confined in the three cells, each salt being a salt which contains an element whose oxide is a glass-forming constituent.

In the manufacture of soda/lime/silica glass two of the molten salt layers may be salts of sodium and calcium, for example sodium chloride and calcium chloride, while the third layer is a layer of a salt containing silicon such as $K_2SiF_6$ mixed with potassium chloride and dissolved silica. The electrodes 33 which dip into the layers 30 of sodium chloride, calcium chloride and $K_2SiF_6$/ $KCl/SiO_2$ mix are connected to a positive supply voltage so that they act as anodes. The electrode 34 is connected to the other terminal of the power supply and acts as a cathode. The current supplied to each of the cells is individually controlled so that there is a controlled liberation of sodium, calcium and silicon into the molten metal in each cell. These liberated elements are swept by the impellers through the channels 26 as shown by the arrows 35, and the release of these elements is so controlled that they are present where the streams 35 intermingle in the prescribed concentrations for the formation of a glass.

The temperature is maintained in this region of the bath at about 1,000° C., and at this temperature glass is synthesized.

Additionally oxidizing conditions may be maintained in the molten metal bath in the region where the three streams intermingle either by maintaining a small amount of oxygen in the headspace over the bath, or by bubbling oxygen or a nitrogen/oxygen mixture or a nitrogen/steam mixture into the molten metal in this region. If desired the headspace and the tank structure may be partitioned to confine the oxidizing conditions to this region of the bath. In any case the amount of oxygen present is so controlled that it reacts with the liberated elements as they are impelled from the channels 26 and there is no excess of oxygen which could react with the molten metal of the bath.

The oxides of sodium, calcium and silicon combine in the bath of molten metal while they are still in molecular form, and the resulting soda/lime/silica glass collectors on the surface of the molten metal. The glass appears as a layer 36 of molten glass in the form of a very thin film of glass which is so light that it can be taken unharmed from the bath without any large degree of cooling or annealing being necessary. The sidewalls 3 of the tank structure may be surfaced as indicated at 37, with a material which is not wetted by molten glass, for example carbon in the form of graphite in order to permit the layer 36 of molten glass to be advanced, without distortion, along the surface of the bath of molten metal.

The tractive effort exerted on the stabilized film of glass 15 as it is taken up from the bath in ribbon form advances the glass along the bath and causes the thin glass film to be continuously drawn away from the region of the bath in which it is formed. Thus by precise regulation of the electrolytic liberation of the glass constituents into the molten metal and of the oxidizing conditions in the bath the glass is formed at a desired rate, and by withdrawing the glass from the bath by a controlled tractive effort applied by the conveyor rollers the cooled film which is taken up from the bath surface and discharged through the outlet has a desired thickness. The molten salt layers 30 are replenished from hoppers 38 which have outlet chutes 39 extending through the end wall 9 of the roof structure and terminating above the salt layers in the cells.

FIGS. 4 to 7 illustrate a more sophisticated apparatus for carrying out the method of the invention. The headspace 6 over the bath of molten metal is divided by a partition 40 which depends downwardly from the roof structure and dips into the surface 14 of the molten metal bath 1. Upstream of the partition a mixing zone is defined between the partition 40 and a further sealing partition 41 which completely closes the headspace downstream of the three electrolytic cells.

Figure 6:
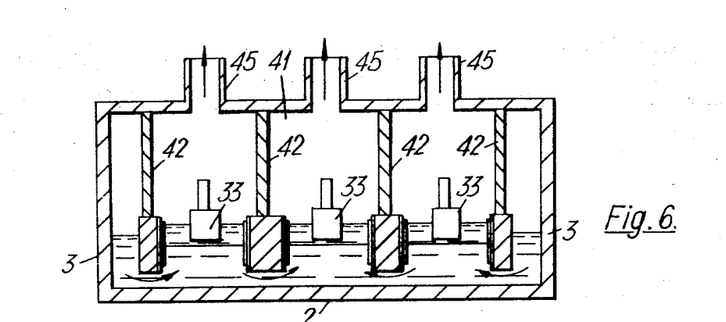
FIG. 6 is a section on line VI—VI of FIG. 5.

The headspace over each cell is a separate chamber defined by longitudinal partitions 42 as illustrated in FIG. 6, and there is a separate gas supply and fan exhaust system for each cell. Gases released during the electrolysis into the headspace over each cell are continuously purged by supplying a nitrogen/hydrogen mixture for example containing 5 percent of hydrogen, to each headspace through ports 43 in the end wall 4 at the hot end of the tank structure, the gases being extracted through outlet ducts 45 which are connected to a fan extraction system.

Figure 5:
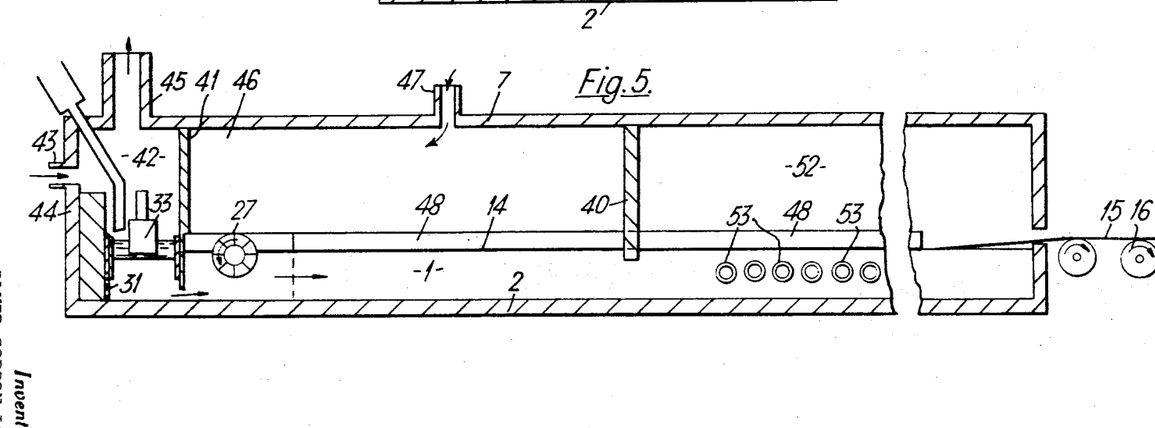
FIG. 5 is a longitudinal sectional elevation of the apparatus of FIG. 4.

In the headspace 46 over the mixing zone of the bath, that is between the partitions 40 and 41, a reducing atmosphere consisting of 10 percent hydrogen and 90 percent nitrogen is supplied through an inlet 47 in the roof structure 7.

Figure 4:
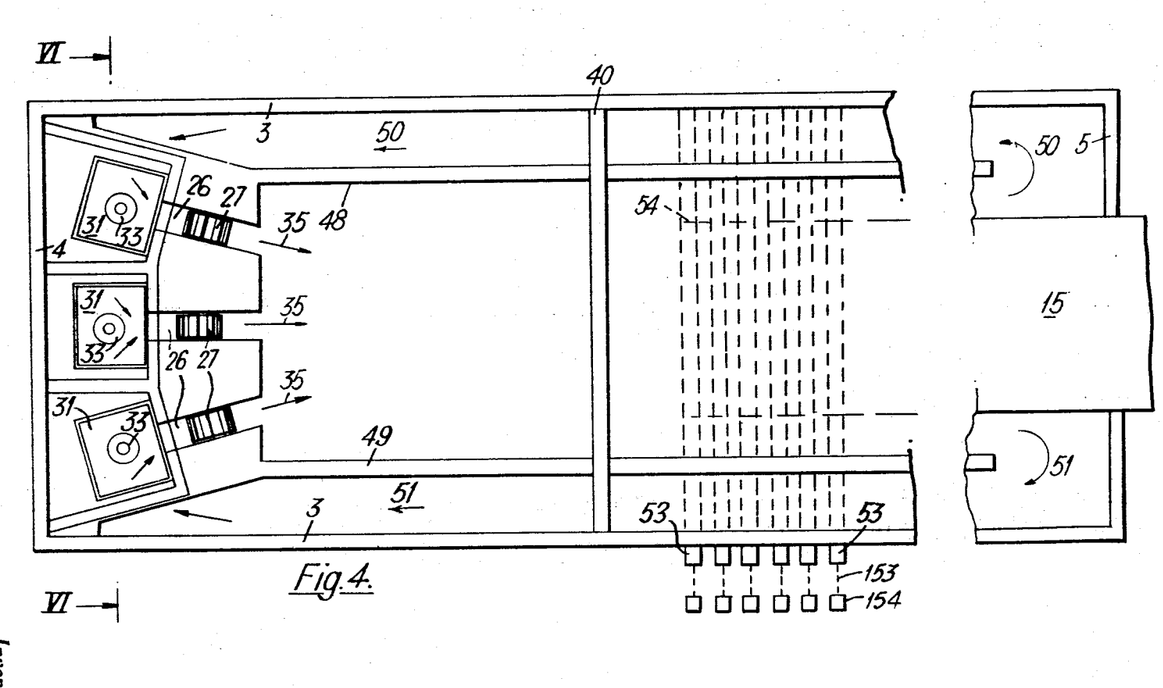
FIG. 4 is a plan view similar to FIG. 2 of a preferred apparatus for carrying out the method of the invention

Two longitudinal refractory barriers 48 and 49 extend along the tank structure from the wall 22 which is built across the tank structure and through which there are channels 26 for the induced flows 35 of molten metal which carry released elements from the cells into the main part of the bath. These refractory barriers 48 and 49 extend downwardly to the floor of the tank structure and so separate the bath metal flows into a central downstream flow constituted by the mingled flows 35 and two return flows indicated by arrows 50 and 51 through the channels defined between the barriers 48 and 49 and the respective sidewalls 3 of the tank structure.

The driving force for the metal flow is from the paddle wheel 27 and the central downstream flow of molten metal from the streams 35 is confined by the barriers 48 and 49 to a well-defined route down the bath through the mixing zone, beneath the partition 40 to an oxidizing zone downstream of the partition. The circulation of the molten metal is completed by the return flows 50 and 51 which bring the molten metal back to the region beneath the electrolytic cells as indicated in FIG. 6.

In the mixing zone which is upstream of the partition 40, the enriched metal flows 35 have become thoroughly mixed and the downstream flow of homogenized molten metal carries the thoroughly mixed glass-forming elements beneath the partition 40 to the oxidizing zone. The meeting of the channelled flows of enriched metal 35 in the mixing zone is sufficient to cause thorough mixing.

Mounted across the tank structure below the bath surface in the oxidizing zone 52 downstream of the partition 40 are a series of parallel, porous refractory tubes 53. These tubes are immersed in the bath metal. Each of the tubes is supplied with an oxidizing atmosphere composed of 1 percent water vapor, 10 percent hydrogen and 89 percent nitrogen, by a pipe 153 through an individual flowmeter 154. This atmosphere is forced through the pores of the refractory tubes under pressure and rises into the molten metal in the oxidizing zone as fine, well-dispersed bubbles. This produces the desired oxidizing conditions in the oxidizing zone to form in the metal in that zone the oxides of the glass-forming elements which condense together to form a synthesized glass which collects as a layer or film on the surface of the molten metal and is eventually removed in ribbon form.

As one example of operating the invention there will be described the production of a ribbon of soda/lime/silica glass, 20 microns thick and 60 cm. wide, and of composition by weight 72 percent silica, 14 percent sodium oxide and 14 percent calcium oxide. The ribbon of glass is withdrawn from the bath at a rate of 15 cm. per minute. The bath consists of 80 percent tin and 20 percent copper.

One of the cells contains a salt layer 30 consisting of eight parts by weight KCl, three parts by weight $K_2SiF_6$ and one part by weight $SiO_2$. Silica is continuously added to the cell at the rate of 3.36 grams per minute and an electrolyzing current of 360 amps flows through the cell.

The second cell contains a layer of pure molten sodium chloride which is continuously added to the cell at the rate of 1.23 grams per minute. The current supplied to the cell is 34 amps.

The third cell contains a layer of pure molten anhydrous calcium chloride which is continuously added to the cell at the rate of 1.36 grams per minute. All three cells are operated at between 850° C. and 1,000° C. and preferably at 900° C. and the headspace in the chamber over each cell is purged with the nitrogen/hydrogen atmosphere which carries away chlorine and salt vapors through the extract ducts thereby avoiding those vapors leaking into the mixing zone adjacent the cells. The elements released from these cells enrich the molten metal which is circulating beneath the cells and the enriched metal is directed from each cell as flows 35 into the mixing zone where the currents from the channels 26 cause a thorough mixing to produce homogenous enriched molten metal.

The temperature over the whole mixing zone is about 1,000° C., and the maintenance of the reducing atmosphere consisting of 10 percent hydrogen and 90 percent nitrogen over this zone ensures that no oxidation of the elements takes place in this zone. The reducing atmosphere is maintained at a higher pressure than the purging atmosphere over the cells and the atmosphere over the oxidizing zone, so that waste gases such as chlorine cannot escape from the electrolytic cells into the mixing zone; neither can oxidizing atmosphere escape from the oxidizing zone into the mixing zone.

The elements are well mixed under the reducing atmosphere at 1,000 C. and the generally downstream flow of the molten metal carries these mixed elements in the homogenized molten metal beneath the partition 40 into the oxidizing zone. The atmosphere of 1 percent water vapor, 10 percent hydrogen and 89 percent nitrogen is used for oxidation of sodium, calcium and silicon in the copper/tin alloy bath.

This atmosphere is strongly oxidizing towards sodium, calcium and silicon even when they are present only as about one part per million in the molten metal. The ratio of 1 percent water vapor to 10 percent hydrogen at 1,000° C. cannot oxidize the molten tin or copper of the molten metal bath to produce dross. The temperature in the region of the oxidizing zone near the partition is maintained at about 1,000° C. and the atmosphere employed oxidizes the glass-forming elements completely while ensuring that the molten metal returned in the return flows 50 and 51 contains no more than a trace of dissolved oxygen.

The oxides so formed in the oxidizing zone are in proportions by weight 72 percent $SiO_2$, 14 percent $Na_2O$ and 14 percent CaO. These oxides condense together to synthesize glass which rises to the surface of the bath and forms a film which begins to take ribbon form where indicated at 54 and is eventually removed as a thin layer of glass 15 in ribbon form.

The temperature at the outlet end of the bath is about 600° C. and a temperature gradient from 1,000° C. down to 600°C. exists along the oxidizing zone so that the layer 15 is gradually cooled and can be removed in ribbon form without damage.

During the return of the molten metal to the hot end of the bath in the return flows 50 and 51 the metal is exposed to reducing atmosphere as it passed along the sides of the mixing zone and the dissolved oxygen level in the tin falls to about 0.25 parts per million. This low level of oxygen in the molten metal fed beneath the electrolytic cells ensures that there is no significant oxidation of the glass-forming elements before they are well mixed and passed beneath the partition 40 into the oxidizing zone.

Figure 7:
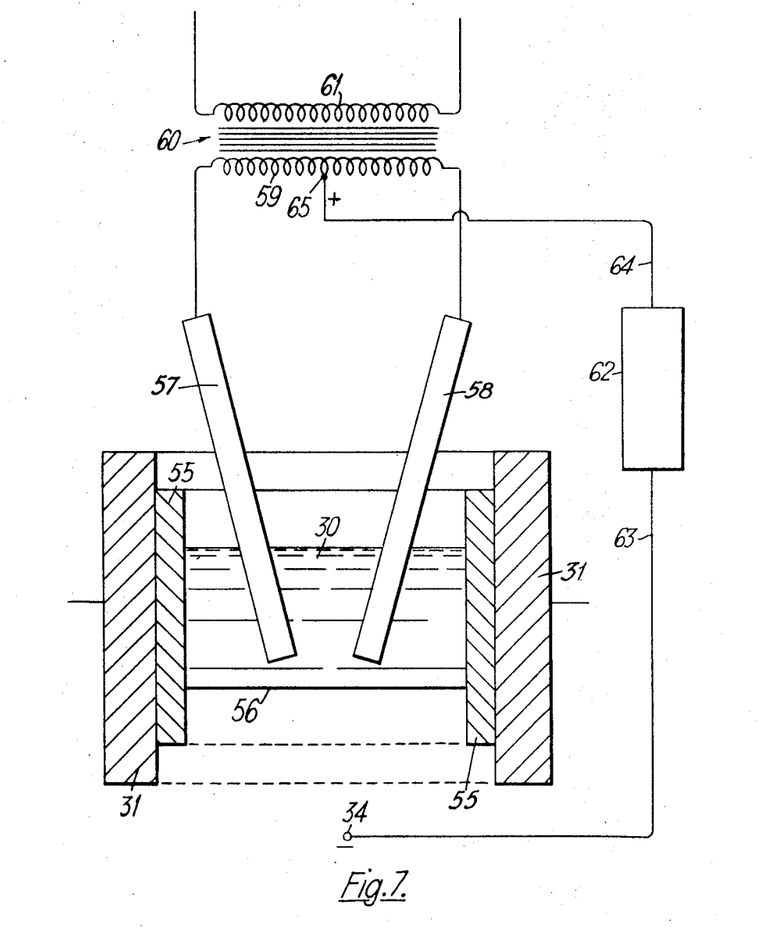
FIG. 7 is an electrical diagram illustrating an electrolytic cell for releasing an element into the molten metal.

An alternative construction of one of the electrolytic cells is illustrated in more detail in FIG. 7. The carbon barrier 31 is in the form of a frame which is a refractory lining 55 of the "-Monofrax." The layer of salt 30 is shallower than the depth of the liner 55 and the molten metal level 56 extends some way up the refractory liner. Two electrodes 57 and 58 dip downwardly into the salt layer and these electrodes are connected to either end of a secondary winding 59 of a supply transformer 60 whose primary winding 61 is connected to a variable AC supply for supplying heating current to the electrodes; for example an alternating supply of 300 amps at 20 volts.

The DC supply of current for example 50 amps at 10 volts, for electrolyzing the salt layer is indicated diagrammatically at 62 and the negative output of this supply is connected by line 63 to the electrode 34 in the bath of molten metal while the positive output of the DC supply 62 is connected by a line 64 to a center tap 65 on the secondary winding of the heating transformer 60. The temperature of the salt layer is accurately controlled by regulating the alternating current passing between the electrodes 57 and 58 and the electrolyzing current for each cell, as referred to above is supplied from a separate variable DC supply 62, there being one such supply for each of the cells.

In another method according to the invention the molten metal of the bath may be a tin alloy which contains a metal whose oxide is to form one constituent of the glass to be produced. For example the bath may be of a molten tin/copper/silicon alloy and silica is formed in the bath by the bubbling of steam into the bath.

It might further be desired to produce a glass having certain tin content and this is effected by increasing the supply of oxygen so that there is oxygen present in excess of that necessary for the basic glass formation, and this excess oxygen reacts with tin or with another metal alloyed with the tin to produce an oxide which is incorporated in the glass.

In such a process it is necessary to replenish the bath metal which is burnt up as its oxide is incorporated in the glass. For example silicon in the bath may be replenished by adding pellets of a silicon/copper/tin alloy to the bath.

In place of silicon other essential glass-forming elements may be added to the molten metal bath electrolytically, for example boron. Potassium and magnesium may be substituted for sodium and calcium.

Although all these elements may be added by the electrolytic method referred to above, as an alternative they may be added in the form of alloys. For example the molten metal bath may be a bath of tin alloy consisting of 80 percent tin and 20 percent copper and the elements silicon, sodium and calcium may be added to the molten metal in the form of pellets of alloys of these three additive elements each pellet being of an alloy consisting of 1 percent of the element, 79 percent tin and 20 percent copper.

Although it is desirable to use tin as the basic constituent of the molten metal bath, tin-free alloys may be used, for example an alloy of silver and copper. One such alloy which may be used is an alloy consisting of 72 percent silver and 28 percent copper. This is the silver/copper eutectic which has a freezing point just below 780° C.

The thin film of glass may be removed from the bath at a much higher temperature than the customary temperature at which glass is removed in methods of manufacturing flat glass during which the glass is in contact with molten metal. Because the glass manufactured by the present invention is thin it is very light and is therefore much less susceptible to surface damage. After the thin film of glass in ribbon form has been removed from the bath on which it is formed, it may be supported, for example, on a supporting pool of molten tin. In another method the thin film may be diverted upwardly from the surface of the bath in which it is formed and drawn upwardly through an annealing lehr.

The new process for the manufacture of thin flat glass described above may be applied to the manufacture of glass having a wide range of compositions which would be suitable for chemical toughening, or for the manufacture of colored glass veneers. A very thin chemically toughened glass produced by the method of the invention, for example having a thickness of 0.1 mm. would combine flexibility with transparency and durability.

We claim:

1. A glass-manufacturing method comprising feeding, into a body of molten metal in proportions to synthesize a glass, glass-forming elements having a greater affinity for oxygen than said body of molten metal, regulating the temperature of the molten metal body in the region of 1,000° C., subjecting the molten metal body containing the glass-forming elements to oxidizing conditions at that temperature, regulating the oxidizing conditions to those wherein not less hydrogen than in the order of 10 to 1 of water vapor is present to ensure preferential formation of oxides of the glass-forming elements which oxides combine to synthesize the glass, permitting the glass to form as a layer on the surface of the body of molten metal, cooling the layer, and removing the glass layer from the molten metal surface.

2. A method according to claim 1, wherein the molten metal body is a body of molten tin.

3. A method according to claim 1, wherein the molten metal body is a body of molten alloy of tin with copper.

4. A method according to claim 3, wherein the alloy consists of 80 percent tin and 20 percent copper.

5. A method according to claim 1, wherein the molten metal body is a body of a molten alloy of tin with silver.

6. A method according to claim 1, wherein the molten metal body is a body of a molten alloy of tin with nickel.

7. A method according to claim 1, wherein the molten metal body is a body of a molten alloy of silver with copper.

8. A method according to claim 7, wherein the alloy consists of 72 percent silver and 28 percent copper.

9. A method according to claim 21, wherein one of the glass-forming elements is silicon.

10. A method according to claim 29, wherein sodium and calcium are also added to the molten metal body.

11. A method according to claim 21, wherein one of the glass-forming elements is boron.

12. A method according to claim 31, wherein potassium is also added to the molten metal body.

13. A method according to claim 31, wherein magnesium is also added to the metal body.

14. A method according to claim 21, wherein one of the glass-forming elements is phosphorous.

15. A method according to claim 21, wherein the oxidizing conditions are regulated by feeding into the molten metal an atmosphere of hydrogen, water vapor and nitrogen, and regulating the relative proportions of hydrogen and water vapor in the atmosphere to maintain an equilibrium of formation of said oxides of the glass-forming elements.

16. A method according to claim 1, wherein the elements are added to the molten metal in the form of alloys.

17. A method according to claim 1, wherein the body of molten metal is an alloy of tin with copper and silicon, the oxidizing conditions are regulated to ensure formation of $SiO_2$ in the body, and the body is replenished by the addition thereto of said alloy of tin with copper and silicon.

18. A method of manufacturing glass film, comprising feeding glass-forming elements in proportions to synthesize a glass into a body of molten metal, said glass-forming elements having a greater affinity for oxygen than said body of molten metal, regulating the temperature of the molten metal body in the region of 1,000° C., subjecting the molten metal body containing those elements to oxidizing conditions at that temperature, regulating the oxidizing conditions to those wherein not less hydrogen than in the order of 10 to 1 of water vapor is present to ensure preferential formation of oxides of the glass-forming elements which oxides combine to synthesize the glass, permitting the glass to form as a film on the surface of the molten metal, cooling the film, and removing the glass film from the molten metal surface.

19. A glass-manufacturing method comprising electrolytically feeding the elements silicon, sodium, and calcium continuously into a bath of a molten alloy of tin with copper, in proportions to synthesize a glass consisting of 72 percent $SiO_2$, 14 percent $Na_2O$ and 14 percent $CaO$, homogenizing the molten metal containing those elements, maintaining the homogenized molten metal in the region of 1,000° C., introducing into the homogenized molten metal at that temperature an atmosphere of 1 percent water vapor, 10 percent hydrogen and 89 percent nitrogen to form in the molten metal $SiO_2$, $Na_2O$ and $CaO$ in said proportions, which oxides combine and synthesize the glass which collects as a layer on the surface of the molten metal, continuously advancing the layer of glass in ribbon form along the bath surface, cooling that glass layer as it is advanced to a state from which it can be removed from the glass surface, and continuously discharging the glass layer from the molten metal surface.

20. A glass-manufacturing method comprising feeding into a body of a molten alloy of 80 percent tin and 20 percent copper, the elements silicon, sodium and calcium in proportions to synthesize a glass, each element being fed into the molten alloy body in the form of an alloy consisting of 1 percent of the element, 79 percent tin and 20 percent copper, regulating the temperature of the molten body in the region of 1,000° C., subjecting the molten body to oxidizing conditions at that temperature, regulating the oxidizing conditions to those wherein not less hydrogen than in the order of 10 to 1 of water vapor is present to ensure preferential formation of $SiO_2$, $Na_2O$ and $CaO$ which oxides combine to synthesize a glass, permitting the glass to form as a layer on the surface of the body of molten alloy, cooling the layer, and removing the glass layer from the surface of the molten body.

21. Glass-manufacturing apparatus comprising an elongated structure consisting of an elongated tank containing a bath of molten metal and a roof bridging the tank and defining a closed headspace thereover, one end of said elongated structure being shut off by an end wall of the roof which rests on an end wall of the tank and the end walls of the roof and the tank at the other end of the elongated structure together defining an outlet for glass, a plurality of glass-forming element feeding means located within the structure at said one end of the structure, oxidizing atmosphere feeding means for maintaining in the molten metal bath oxidizing conditions conducive to formation therein of oxides of said glass-forming elements, temperature regulators associated with the bath for maintaining the molten metal in which said oxides are formed at a temperature of about 1,000° C. so that glass is synthesized and collects as a layer on the bath surface, and conveying means associated with the outlet for conveying the glass layer in ribbon form off the bath surface.

22. Apparatus according to claim 21, wherein said feeding means comprises a plurality of electrolytic cells defined at said one end of the tank by partitions extending into the bath of molten metal, the partitions being formed with apertures permitting circulation of molten metal through each cell, impeller means associated with each cell for circulating the molten metal through each cell, means for confining a layer of a molten metal salt on the molten metal surface in each cell, an electrical connection to the molten metal in each cell, an electrode arranged in each cell to dip into a layer of molten salt confined in the cell, and an electrical supply circuit individually connected to said electrodes and to the molten metal so as to pass electrolyzing current through the layer of molten salt in each cell.